US010594565B2

(12) United States Patent
Agarwal et al.

(10) Patent No.: US 10,594,565 B2
(45) Date of Patent: Mar. 17, 2020

(54) MULTICAST ADVERTISEMENT MESSAGE FOR A NETWORK SWITCH IN A STORAGE AREA NETWORK

(71) Applicant: HEWLETT PACKARD ENTERPRISE DEVELOPMENT LP, Houston, TX (US)

(72) Inventors: Vivek Agarwal, Littleton, MA (US); Rupin Mohan, Littleton, MA (US); Krishna Puttagunta, Roseville, CA (US); Andrew E. S. MacKay, Carp (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/507,534

(22) PCT Filed: Dec. 19, 2014

(86) PCT No.: PCT/US2014/071358
§ 371 (c)(1),
(2) Date: Feb. 28, 2017

(87) PCT Pub. No.: WO2016/099528
PCT Pub. Date: Jun. 23, 2016

(65) Prior Publication Data
US 2017/0302529 A1   Oct. 19, 2017

(51) Int. Cl.
*G06F 15/173* (2006.01)
*H04L 12/24* (2006.01)
(Continued)

(52) U.S. Cl.
CPC .......... *H04L 41/12* (2013.01); *H04L 12/1859* (2013.01); *H04L 12/1895* (2013.01);
(Continued)

(58) Field of Classification Search
CPC . H04L 41/12; H04L 12/1859; H04L 12/1895; H04L 12/4625; H04L 41/0816; H04L 67/1097; H04L 69/6912
(Continued)

(56) References Cited

U.S. PATENT DOCUMENTS 6,331,983 B1    12/2001  Haggerty et al.
6,389,432 B1 *   5/2002  Pothapragada ....... G06F 3/0605
(Continued)

FOREIGN PATENT DOCUMENTS

CN    101931650 A    12/2010
CN    102483702 A     5/2012
(Continued)

OTHER PUBLICATIONS

European Patent Office, "Extended European Search Report," dated Nov. 17, 2017, issued in European Patent Application No. 14908606.
(Continued)

*Primary Examiner* — Alan S Chou
(74) *Attorney, Agent, or Firm* — Hewlett Packard Enterprise Patent Department (57) ABSTRACT

In some examples, a network switch can connect to another network device in a Storage Area Network (SAN) to allow the network switch and the other network device to transfer data therebetween. The network switch can further receive a multicast advertisement message from the other network device. The network switch can parse the advertisement message to identify LUN metadata attributes for the other networking device.

15 Claims, 5 Drawing Sheets

(51) Int. Cl.
   *H04L 29/08* (2006.01)
   *H04L 12/46* (2006.01)
   *H04L 12/18* (2006.01)
   *H04L 29/06* (2006.01)

(52) U.S. Cl.
   CPC ...... *H04L 12/4625* (2013.01); *H04L 41/0816* (2013.01); *H04L 67/1097* (2013.01); *H04L 69/12* (2013.01)

(58) Field of Classification Search
   USPC .......................................................... 709/224
   See application file for complete search history.

(56) References Cited

U.S. PATENT DOCUMENTS

| | | | |
|---|---|---|---|
| 6,778,531 | B1 | 8/2004 | Kodialam et al. |
| 7,464,184 | B2 | 12/2008 | Shiga et al. |
| 7,558,219 | B1 | 7/2009 | Aggarwal et al. |
| 7,685,261 | B1 | 3/2010 | Marinelli et al. |
| 7,852,841 | B2 | 12/2010 | Wijnands et al. |
| 7,925,778 | B1 | 4/2011 | Wijnands et al. |
| 8,230,085 | B2 | 7/2012 | Roa |
| 8,619,774 | B2 | 12/2013 | Nalawade |
| 8,638,789 | B1 | 1/2014 | Pani |
| 8,892,818 | B1 | 11/2014 | Zheng et al. |
| 8,954,957 | B2 | 2/2015 | Wu et al. |
| 9,143,437 | B1 | 9/2015 | Grosser et al. |
| 9,912,612 | B2 | 3/2018 | Sabaa et al. |
| 2001/0052029 | A1 | 12/2001 | Harbin |
| 2003/0005149 | A1 | 1/2003 | Haas et al. |
| 2003/0023896 | A1 | 1/2003 | Kashyap |
| 2003/0079019 | A1* | 4/2003 | Lolayekar .......... H04L 67/1097 709/226 |
| 2003/0187973 | A1 | 10/2003 | Wesley |
| 2004/0081196 | A1 | 4/2004 | Elliott |
| 2004/0133634 | A1 | 7/2004 | Luke et al. |
| 2005/0053073 | A1 | 3/2005 | Kloth et al. |
| 2005/0091353 | A1 | 4/2005 | Gopisetty et al. |
| 2006/0109850 | A1 | 5/2006 | Otani et al. |
| 2006/0114903 | A1 | 6/2006 | Duffy et al. |
| 2006/0268873 | A1 | 11/2006 | Tonjes et al. |
| 2007/0104194 | A1 | 5/2007 | Wijnands et al. |
| 2007/0112931 | A1 | 5/2007 | Kuik et al. |
| 2007/0183405 | A1 | 8/2007 | Bennett |
| 2008/0092181 | A1 | 4/2008 | Britt |
| 2008/0212583 | A1 | 9/2008 | Rey et al. |
| 2009/0154454 | A1* | 6/2009 | Wittenschlaeger ..... H04L 45/02 370/389 |
| 2009/0245256 | A1 | 10/2009 | Yan et al. |
| 2010/0061383 | A1 | 3/2010 | Rupanagunta et al. |
| 2010/0115099 | A1 | 5/2010 | Gu et al. |
| 2010/0135298 | A1 | 6/2010 | Park et al. |
| 2010/0142529 | A1 | 6/2010 | Huang et al. |
| 2010/0226244 | A1 | 9/2010 | Mizutani et al. |
| 2010/0251269 | A1 | 9/2010 | Remmert |
| 2011/0004876 | A1 | 1/2011 | Wu et al. |
| 2011/0093251 | A1 | 4/2011 | Belgaied et al. |
| 2011/0185089 | A1 | 7/2011 | El et al. |
| 2011/0191637 | A1 | 8/2011 | Wight et al. |
| 2012/0106558 | A1 | 5/2012 | Dickens et al. |
| 2012/0159607 | A1 | 6/2012 | Wei et al. |
| 2012/0163427 | A1 | 6/2012 | Kim |
| 2012/0177039 | A1 | 7/2012 | Berman |
| 2012/0182992 | A1 | 7/2012 | Cowart et al. |
| 2012/0239652 | A1 | 9/2012 | Wood et al. |
| 2012/0254353 | A1 | 10/2012 | Baba et al. |
| 2012/0284309 | A1* | 11/2012 | Adkins ................. G06F 3/0607 707/782 |
| 2013/0021942 | A1 | 1/2013 | Bacthu et al. |
| 2013/0028135 | A1 | 1/2013 | Berman |
| 2013/0148511 | A1 | 6/2013 | Banga et al. |
| 2013/0163427 | A1 | 6/2013 | Beliveau et al. |
| 2013/0223451 | A1 | 8/2013 | Zur et al. |
| 2013/0266007 | A1 | 10/2013 | Kumbhare et al. |
| 2013/0329743 | A1 | 12/2013 | Gai et al. |
| 2014/0112192 | A1 | 4/2014 | Chou et al. |
| 2014/0112344 | A1 | 4/2014 | Mineshita |
| 2014/0115182 | A1 | 4/2014 | Sabaa et al. |
| 2014/0115579 | A1 | 4/2014 | Kong |
| 2014/0189074 | A1 | 7/2014 | Parker |
| 2014/0207849 | A1 | 7/2014 | Bestler et al. |
| 2014/0226526 | A1 | 8/2014 | DeSanti |
| 2014/0281817 | A1 | 9/2014 | Grube et al. |
| 2014/0351396 | A1 | 11/2014 | Stabile et al. |
| 2015/0236911 | A1 | 8/2015 | Unnimadhavan et al. |
| 2016/0285972 | A1 | 9/2016 | Puttagunta et al. |
| 2016/0315847 | A1 | 10/2016 | Zhang et al. |
| 2017/0034008 | A1 | 2/2017 | Puttagunta et al. |
| 2017/0155599 | A1 | 6/2017 | Vobbilisetty et al. |
| 2017/0214719 | A1 | 7/2017 | Mohan et al. |

FOREIGN PATENT DOCUMENTS

| | | |
|---|---|---|
| EP | 1324536 B1 | 5/2008 |
| IN | 00131CH2011 A | 10/2012 |
| WO | 2012/173172 A1 | 12/2012 |
| WO | 2013/139298 A1 | 9/2013 |
| WO | 2013/165340 A1 | 11/2013 |
| WO | 2014/041550 A1 | 3/2014 |
| WO | WO-2015167448 A1 | 11/2015 |

OTHER PUBLICATIONS

Zhang et al., "A destination-initiated multicast routing protocol for shortest path tree constructions", In GLOBECOM'03, IEEE Global Telecommunications Conference (IEEE Cat. No. 03CH37489), vol. 5, 2003, pp. 2840-2844.

Srinivasan, Manikantan, "Tutorial on the link layer discovery protocol", EE Times, Wireless and Networking Designline, 2005, pp. 1-6.

Lee et al., "Konark: A system and protocols for device independent, peer-to-peer discovery and delivery of mobile services", IEEE transactions on systems, man, and cybernetics—Part A: systems and humans, vol. 33, No. 6, 2003, pp. 682-696.

Wikipedia, "Multiprotocol Label Switching," available online at <https://en.wikipedia.org/w/index.php?title=Multiprotocol_Label_Switching&oldid=579274534>, Oct. 29, 2013, 5 pages.

Suba Varadarajan, "Virtual Local Area Networks", available at <www.cse.wustl.edu>, Aug. 14, 1997, 12 pages.

Rivka Gewirtz Little, "SDN data center case study: Using OpenFlow for converged storage," May 7, 2013, SearchSDN.com, available online at <http://searchsdn.techtarget.com/news/2240183598/SDN-data-center-case-study-Using-OpenFlow-for-converged-storage?vgnextfmt=print>, 2 pages.

QLogic Corporation, "SANsurfer FC HBA Manager User's Guide", Management Tool for QLogic Fibre Channel and FCoE Adapters, 2012, 144 pages.

QLogic Corporation, "SANbox 5602 Switch Management User's Guide", Firmware Version 4.2, 59097-00 A, Oct. 2004, 270 pages.

Open Networking Foundation, "OpenFlow Switch Specification," ONF TS-012, Version 1.4.0 (Wire Protocol 0x05), Oct. 14, 2013, 206 pages.

Mellanox Technologies, "SwitchX (Registered)-2 Ethernet Optimized for SDN", Switch Silicon, Product Brief, Apr. 25, 2013, 2 pages.

Juniper Networks, "QFabric System," (Research Paper), Data Sheet, Oct. 2013, 11 pages, available at http://www.juniper.net/us/en/local/pdf/datasheets/1000393-en.pdf.

Jeda Networks, "Virtualizing the SAN with Software Defined Storage Networks," (Research Paper), Mar. 11, 2014, 6 pages, available at http://www.jedanetworks.com/wp-contentJuploads/2014/03/140226-wp-Virtualizing-SDSN-FINAL.pdf.

International Search Report and Written Opinion received for PCT Patent Application No. PCT/US2014/071358, dated Sep. 11, 2015, 8 pages.

International Search Report and Written Opinion received for PCT Patent Application No. PCT/US2014/054774, dated May 21, 2015, 7 pages.

(56) References Cited

OTHER PUBLICATIONS

International Search Report and Written Opinion received for PCT Patent Application No. PCT/US2014/035805, dated Jan. 21, 2015, 8 pages.
International Search Report and Written Opinion received for PCT Patent Application No. PCT/US2013/068073, dated Jun. 27, 2014, 7 pages.
International Search Report & Written Opinion received in PCT Application No. PCT/US2014/063554, dated Jun. 4, 2015, 15 pages.
International Preliminary Report on Patentability received for PCT Patent Application No. PCT/US2014/071358, dated Jun. 29, 2017, 6 pages.
International Preliminary Report on Patentability received for PCT Patent Application No. PCT/US2014/054774, dated Mar. 23, 2017, 6 pages.
International Preliminary Report on Patentability received for PCT Patent Application No. PCT/US2014/035805, dated Nov. 10, 2016, 7 pages.
Hewlett-Packard Development Company, L.P., "Realizing the power of SDN with HP Virtual Application Networks", Technical white paper, Oct. 2012, 10 pages.
Extended European Search Report received in EP Application No. 13896685.8, dated Jul. 6, 2017, 6 pages.
Darryl Brooks, "Make your SAN administrator's life easier with Brocade's Fabric Manager", (webpage), available online at <https://searchstorage.techtarget.com/magazineContent/Make-your-SAN-administrators-life-easier-with-Brocades-Fabric-Manager?vgnextfmt=print>, Sep. 12, 2002, 3 pages.
Cisco, "iSCSI Configuration," (web Page), Part 3, Chapter 20, Cisco MDS 9000 Family Fabric Manager Configuration Guide, Release 2.x, copyright 1992-2016, available at <http://www.cisco.com/en/US/docs/storage/san_switches/mds9000/sw/rel_2_x/fm/configuration/guide/fscsi.html#wp1672970>, 26 pages.
Cisco, "Cisco Fabric Manager 5.0: Visibility and Control for the Unified Data" Dec. 14, 2006, 18 pages.
Cisco Systems, Inc., "Cisco Fabric Manager Server Federation Deployment Guide", Cisco MDS NX-OS Release 5.0(1a), Cisco MDS 9000 FabricWare Release 5.x, Feb. 2010, 34 pages.
Chaitanya, S. et al., "Design, Implementation and Evaluation of Security in iSCSI-based Network Storage Systems," (Research Paper), Proceedings of the Second ACM Workshop on Storage Security and Survivability, Oct. 30, 2006, 12 pages.
Cai et al., "Survey on Converged Data Center Networks with DCB and FCoE: Standards and Protocols", (Research Paper), Jul.-Aug. 2013, vol. 27, No. 4, 6 pages.
Brocade Communications Systems, Inc., "Unifying Management across the Data Center", Data Sheet, Sep. 2009, 4 pages.
Brocade Communications Systems, Inc., "The Growing Need for Security in Storage Area Networks", White Paper, Apr. 2011, 14 pages.
Brocade Communications Systems, Inc., "SAN Fabric Resiliency Best Practices," Technical Brief, v2.0, Jul. 2013, 35 pages.
Brocade Communications Systems, Inc., "SAN Fabric Administration Best Practices Guide Support Perspective", White Paper, May 2015, 24 pages.
Alba, A. et al., "Efficient and Agile Storage Management in Software Defined Environments," (Research Paper), IBM Jounal of Research and Development 58.2/3, Mar. 2014, 12 pages, available at http://rboutaba.cs.uwaterloo.ca/Courses/CS856-F14/Papers/06798748.pdf.
International Search Report & Written Opinion received in PCT Application No. PCT/US2014/071358, dated Sep. 11, 2015, 10 pages.
Juniper Networks, "QFabric System," (Web Page), Apr. 23, 2014, available at http://www.juniper.net/us/en/local/pdf/datasheets/1000393-en.pdf.

* cited by examiner

MULTICAST ADVERTISEMENT MESSAGE FOR A NETWORK SWITCH IN A STORAGE AREA NETWORK

BACKGROUND

Computer networks can be implemented to allow networked devices, such as personal computers, servers, data storage devices, etc., to communicate and share resources. One type of network implementation is a Storage Area Network (SAN), which can, for example, be in the form of a high-speed network that interconnects different kinds of data storage devices (e.g., disk arrays, tape libraries, optical jukeboxes, etc.) with associated end device elements (e.g., workstations, servers, etc.) on behalf of a large network of users, Such storage area networks can include intermediary data path devices such as network switches, gateways, and routers to flow traffic along one or more data routing paths between networked devices.

DETAILED DESCRIPTION

As provided above, SANs can be used to allow networked devices to communicate and share resources. SANs are often implemented to allow the exchange of storage data through the use logical unit numbers (LUNs), which car be described as numbers used by the SAN to identify a logical unit. A logical unit can, for example, refer to a device addressed by a SAN protocol (e.g., Fibre Channel, etc.) and can, for example, refer to a logical disk created on a SAN as well as certain hardware devices that support read/write operations, such as suitable tape drives, disk drives, and the Network devices within a SAN fabric are generally unaware of various metadata attributes of LUN-related data being routed by the device, such as for example LUN storage tier (e.g., tier 1, 2 or 3 storage), business purpose of the LUN (e.g., whether the LUN will be used for exchange server, data base, logs or file system), etc. Certain implementations of the present disclosure are directed to systems, methods, and devices designed to allow SAN fabric devices to determine LUN metadata attributes and to act on this information. For example, in some implementations, LUN metadata attributes are advertised to SAN fabric devices using a multicast advertisement message through data channels (e.g., through a data port of a network switch within the SAN) and/or management channels (e.g., through a management port of a network switch within the SAN).

Implementations of the present disclosure can exhibit numerous advantages compared to existing SAN configurations. For example, in some implementations, dynamic policy enforcement can be implemented by the SAN fabric devices based on the metadata attributes of the LUN. Additional or alternative actions can be taken based on the LUN metadata attributes, such as the application of tailored Quality of Service (QoS), security, or diagnostic profiles for the LUN (or any suitable combination thereof). In certain implementations, for example in certain implementations where multicast advertisement messages are used, end devices can push the LUN metadata attributes to a fabric database rather than having a management application pull the information through APIs or other means. In certain implementations, for example in certain implementations where LUN information is passed through "out of band" management channels, no "in band" data bandwidth is used to convey the LUN information, and as a result, there will be no data Input/Output performance impact. Other advantages of the solutions presented herein will be apparent upon review of the description and figures.

Figure 1:
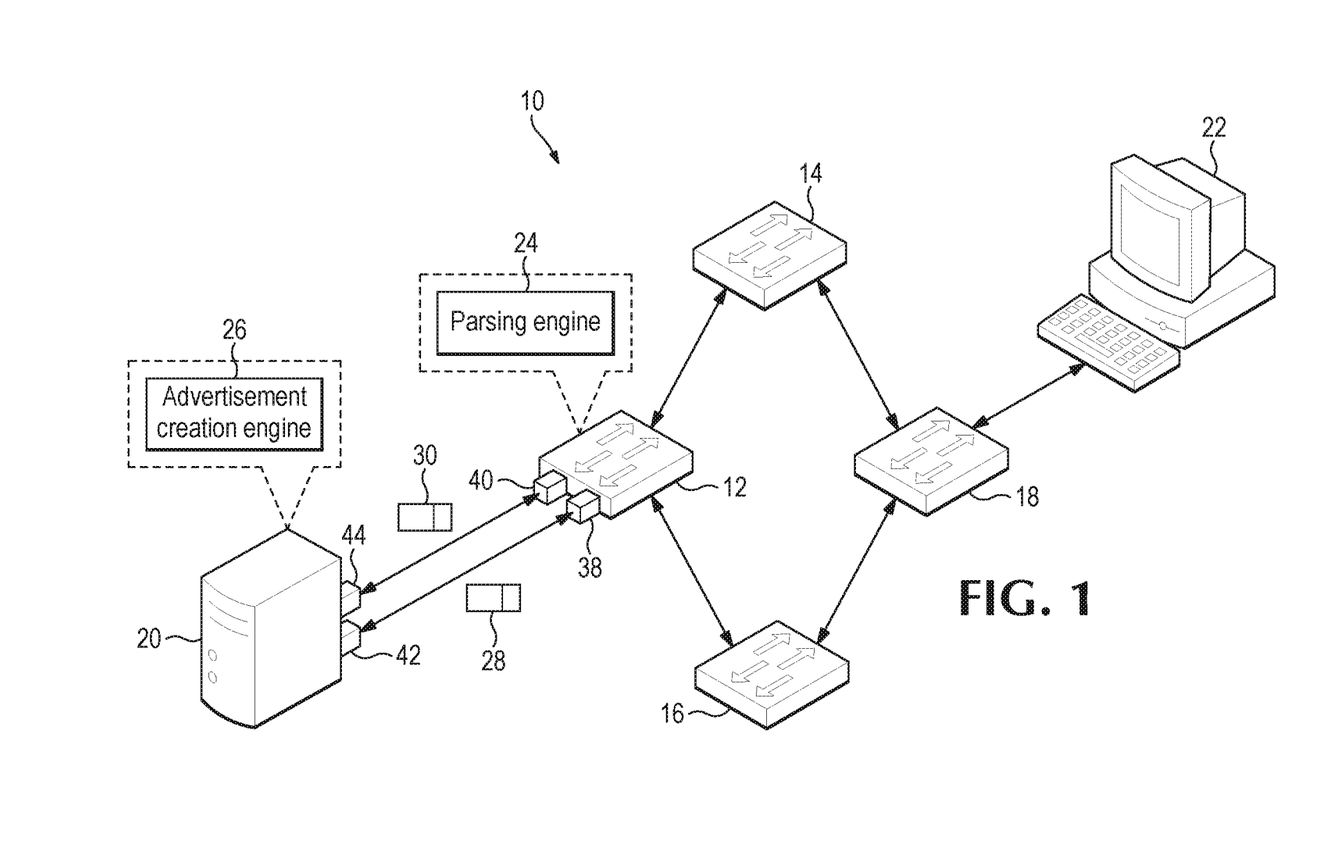
FIG. 1 depicts a storage area network, according to an example.

FIG. 1 illustrates an example SAN 10 including various network switches (12, 14, 16, and 18) connecting a SAN target 20 to a SAN initiator 22. It is appreciated that the solutions described herein can be used or adapted for use with SANs including greater or fewer devices, different types of devices, and different network arrangements. For illustration, switch 12 and target 20 of FIG. 1 are depicted as including a parsing engine 24 and advertisement creation engine 26 respectively for use in implementing functionality of the present disclosure (e.g., functionality relating to a multicast advertisement message 28). These engines and other aspects of switch 12 and target 20 are described in further detail with respect to FIGS. 2-5 and their related description.

As described above, in SAN 10 of FIG. 1, SAN target 20 is networked with SAN initiator 22. The term "initiator" as used herein can, for example, refer to a network endpoint that initiates a storage networking protocol session (e.g., sessions for parallel Small Computer System Interface (SCSI), Fibre Channel Protocol (FCP), Internet SCSI (iSCSI), Serial ATA (SATA), ATA over Ethernet (AoE), InfiniBand, Digital Storage Systems Interconnect (DSSI), or another suitable protocol). The term "target" as used herein can, for example, refer to a network endpoint that does not initiate a session, but instead waits for a command from an initiator and provide requested input/output data transfers, such as SAN data 30. Although various suitable storage networking protocols may be implemented with the solutions presented herein, for convenience this disclosure will primarily focus on SCSI and Fibre Channel protocols.

Target 20 and initiator 22 can, for example, be in the form of network hosts or other suitable types of network nodes. For example, target 20 and initiator 22 can be in the form of suitable servers, desktop computers, workstations, laptops, printers, etc., or any suitable combination thereof. As but one example (which is depicted in FIG. 1), initiator 22 can be in the form of a desktop computer including a monitor for presenting information to an operator and a keyboard arid mouse for receiving input from an operator, and target 20 can be in the form of a standalone storage server appliance. It is appreciated that, in some implementations, initiator 22 and target 20 can be virtualized nodes in a virtual machine (VM) running on a server.

It is appreciated that initiator 22 and target 20 can be endpoint nodes on SAN 10, intermediate nodes between endpoint nodes, or other types of network nodes. It is further appreciated that the use of "initiator" and "target" is for convenience regarding aspects of the network nodes and is not intended, for example, to limit initiator 22 to only initiator-related functionality or to limit target 20 to only target-related functionality. Indeed, in some circumstances (e.g., at certain times), initator 22 may function as a target to target 20 and target 20 may function as an initiator to initiator 22.

In operation, storage volumes of target 20 are routed from target 20 to initiator 22 (e.g., a Fibre Channel data port) via SAN fabric devices of SAN 10, such as network switches 12, 14, 16, and 18. The term "fabric" as used herein can, for example, refer to a network topology in which network nodes interconnect via one or more network switches to spread network traffic across multiple physical links. Suitable switches can, for example, be in the form of network switches or other multi-port network bridges to process and forward data at the data link layer. In some implementations, one or more of the switches can be in the form of virtual multilayer switches that operate at multiple layers of the OSI model (e.g., the data link and network layers). Although the term "switch" is used throughout this description, it is appreciated that this term can refer broadly to other suitable network data forwarding devices. For example, a general purpose computer can include suitable hardware and machine-readable instructions that allow the computer to function as a network switch. It is appreciated that the term "switch" can include other SAN fabric routing devices in the form of suitable routers, gateways and other devices that can provide switch-like functionality for a SAN.

Flow paths can be installed on network switches 12, 14, 16, and 18 to flow traffic along a selected routing path defined by the switches. The switches can, for example, be designed to forward traffic along a datapath based on metadata within the traffic. For example, traffic received at a node can be in the form of a packet that includes route-related metadata. The term "packet" is used herein for convenience, however, it is appreciated that the term is intended to refer to any suitable protocol data unit (PDU). Suitable packets can, for example, include payload data as well as metadata in the form of control data. Control data can, for example, include data to assist the node with reliably delivering the payload data. For example, control data can include network addresses for initiator 22 and target 20, error detection codes, sequencing information, and packet size of the packet. In contrast, payload data can include data carried on behalf of an application for use by initiator 22 and target 20.

Each node within SAN 10 can, for example, be designed to help manage the flow of data across the network by only transmitting a received message to a destination node for which the message was intended (or to an intermediary device en route to the destination device). In some implementations, the virtual nodes can rely on flow entries in flow tables stored on a machine-readable medium within each switch (or otherwise accessible by each switch). Each flow entry in a flow table can, for example, contain information such as: (1) match fields to match against packets (e.g., an ingress port and specific packet header fields), (2) a priority value for the flow entry to allow prioritization over other flow entries, (3) counters that are updated when packets are matched, (4) instructions to modify the action set or pipeline processing, and (5) timeouts indicating a maximum amount of time or idle time before a flow is expired, and (6) a cookie value which can be used to filter flow statistics, flow modification, and flow deletion.

In some implementations, SAN 10 can be implemented as a virtual network. The term "virtual network" as used herein can, for example, refer to a computer network that includes, at least in part, virtual network links and virtual devices implemented using methods of network virtualization. As but one example, a virtual switch can be implemented to a virtual network, which can allow virtual machines to communicate using the same protocols as physical switches. The virtual switch can, for example, emulate a traditional physical Ethernet and/or Fibre Channel capable network switch by forwarding frames at the data-link layers. Similarly, virtual routers can be implemented that are designed to route packets from one network to another based on decisions taken from routing tables. The functionality of such a virtual router may be similar to that of a physical router but packets can be sent between virtual machines within the network. Virtual machines can, for example, have virtual Ethernet cards, which can be treated similarly to a physical (i.e., non-virtual) Network Interface Card (NIC) for use in a physical (i.e., non-virtual) network.

Figure 2:
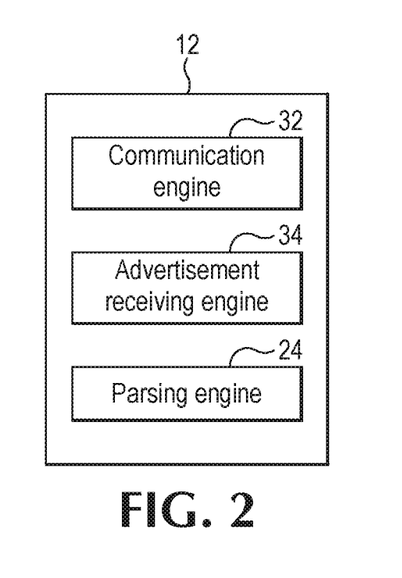
FIG. 2 is a block diagram depicting a network switch for use in the storage area network of FIG. 1, according to an example.

FIG. 2 illustrates one example of network switch 12 for use with a SAN. For illustrations, aspects of SAN 10 of FIG. 1 are referred to in the description of switch 12 of FIG. 2. However, it is appreciated that switch 12 can be implemented in any suitable SAN. As described in full detail below, certain implementations of switch 12 can be used to parse multicast advertisement messages 28 and act on the information based upon advertised attributes within messages 28. In the implementation of FIG. 2, switch 12 includes: (1) a communication engine 32 to connect the network switch to other network devices within SAN 10 to allow switch 12 and the other network devices to transfer data therebetween; (2) an advertisement receiving engine 34 to receive a multicast advertisement message from another network device; and (3) a parsing engine 24 to parse the advertisement message to identify LUN metadata attributes for the other networking device. Each engine of switch 12 is described in further detail below.

Switch 12 is described herein using functional engines. Such functional engines can, for example, be operative to execute one or more steps of methods or other operations described herein, As used herein, the term "engine" refers to a combination of hardware (e.g., a processing resource such as an integrated circuit or other circuitry) and software (e.g., machine- or processing resource-executable instructions, commands, or code such as firmware, programming, or object code). A combination of hardware and software can include hardware only (i.e., a hardware element with no software elements), software hosted at hardware (e.g., software that is stored at a memory resource and executed or interpreted at a processing resource), or at hardware and software hosted at hardware. Additionally, as used herein, the singular forms "a," "an," and "the" include plural referents unless the context clearly dictates otherwise. Thus, for example, the term "engine" is intended to mean one or more engines or a combination of engines. Each engine of switch 12 can include one or more machine-readable storage mediums and one or more computer processing resources. As but one example, software that provides the functionality of engines on switch 12 can be stored on a memory resource of a computer to be executed by a processing resource of the computer.

As described above, the implementation of communication engine 32 in FIG. 2 includes a combination of hardware and software to connect switch 12 to other network devices in SAN 10 to allow switch 12 and the other network devices to transfer data therebetween. In some implementations, communication engine 32 includes a management port 38 and a data port 40 to communicate with the other network devices. Likewise, target 20 includes a corresponding management port 42 and data port 44. Announcements can be sent throughout SAN 10 using in-band channels (e.g., through data ports) or out-of-band channels (e.g., through management ports). The term "data port" as used herein can, for example, refer to a port that services the contents of multicast advertisement message 28, In some implementations, communication engine 32 can include a network interface controller having an Ethernet port and/or a host bus adapter having a Fibre Channel port. For example, Ethernet drivers for management ports of network devices within SAN 10 can be interfaced through predefined input/output control (ioctl) request codes. The term "ioctl" as used herein can, for example, refer to a special system call for device-specific input/output operations and other operations which are not expressed by regular system calls. Communication engine 32 can, for example, include hardware, related firmware, and other software for allowing the hardware to operatively communicate with other hardware of SAN 10. Communication engine 32 can, for example, include machine-readable instructions for use with communication engine 32, such as firmware for implementing and/or administering physical or virtual network ports.

As described above, the implementation of advertisement receiving engine 34 in FIG. 2 includes a combination of hardware and software to receive multicast advertisement message 28 (see FIG. 1) from another network device (e.g., target 20) through management port 38 of communication engine 32, For illustration, target 20 is used throughout this application as an example network device that creates and transmits advertisement message 28 to switch 12. It is appreciated, however, that any suitable network device in SAN 10 or another SAN can be used for this functionality. As described in further detail below with respect to advertisement transmission instructions of FIG. 4, in some implementations, advertisement message 28 is received by switch 12 via a push technology (e.g., wherein the request for a given transaction is initiated by a publisher) as opposed to pull technology (e.g., where the request is initiated by switch 12).

In some implementations, the multicast advertisement message 28 is designed to provide switches with information about storage volumes attributes to process during a LUN masking process. In some implementations, compatible switches within the fabric of SAN 10 will be aware of various volume attributes such as LUN Storage Tier (Tier 1, 2 or 3 storage), business purpose of the LUN (like, LUN will be used for exchange server, data base, logs or file system etc.), etc. so as to allow the switch to apply pre-defined security, QoS and diagnostic profiles based on LUN category. In particular, advertisement message 28 can be parsable to identify LUN metadata attributes for the other network device (e.g., target 20). For example, in some implementations, advertisement message 28 is parsable to identify: (1) a LUN Storage Tier for the LUN; (2) a use category for the LUN; (3) an exchange server use category for the LUN; (4) a database use category for the LUN; (5) a file system use category for the LUN; and (6) any suitable combinations thereof. Advertisement message 28 can additionally or alternatively be parsable to identify other LUN metadata attributes or other attributes of SAN 10. Further description of the creation and transmission of advertisement message 28 is provided below with respect to FIGS. 2-5 and their related description.

As described above, the implementation of parsing engine 24 in FIG. 2 includes a combination of hardware and software to parse advertisement message 28 to identify LUN metadata attributes for the other networking device. With respect to a certain implementation of switch 12, LUN metadata attributes can be included in advertisement message 28 in pre-defined format and when switch 12 receives an in-band or out-of-band multicast advertisement message 28 from an end device (e.g., target 20) or another switch (e.g., switch 14), it can parse the message arid compile the parsed information into a pre-defined tabular data format. In some implementations, advertisement message 28 can be parsed based upon a unique identifier for a device in question (UUID) which is unique among SAN endpoints along with a unique port ID of end devices. It is appreciated that the term "parse" and "passable" as used herein can refer to operations that process the message before separating its contents. As but a few examples, in some implementations, a message can first be decoded, decrypted, or otherwise processed to allow parsing.

In some implementations, multicast packet acceptance criteria can be collected from each of the individual connections in the SAN fabric that are targeted for multicast transmission at a predefined multicast address along with a predefined ULAN ID. As described in further detail below with respect to FIG. 3, in some implementations, once the LUN metadata attributes of advertisement message 28 are parsed, switch 12 can act on the information, such as by applying tailored Quality of Service (QoS), security, or diagnostic profiles for the LUN (or any suitable combination thereof).

Figure 3:
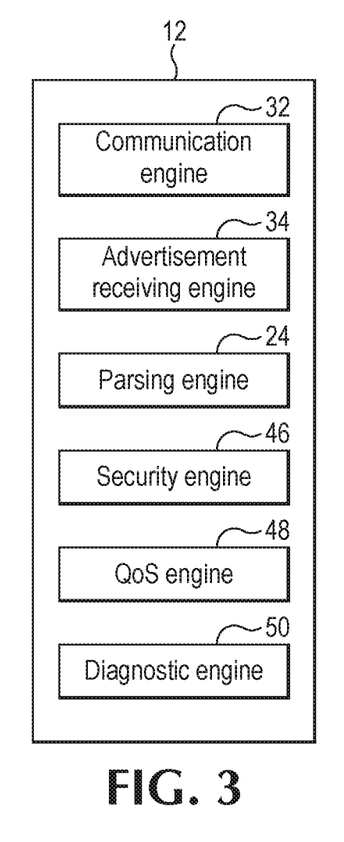
FIG. 3 is a block diagram depicting a network switch for use in the storage area network of FIG. 1, according to another example.

Several engines are described above with respect to switch 12. However, it is appreciated that other engines can be added to switch 12 for additional or alternative functionality. As another example, in some implementations, switch 12 can include an I/O engine that is a combination of hardware and software to allow an operator to view and/or interact with switch 12. For example, in some implementations, switch 12 can include one or more suitable I/O engines, such as engines for monitors, printers, keyboards, mouses, styluses, touchscreens, speakers, etc., which can allow interaction via a graphical user interface (GUI), command line interface (CLI), or another suitable interface. I/O devices for such engines can be connected to elements of switch 12 via wired or wireless links. FIG. 3 also provides additional examples of engines that can be added to switch 12.

It is appreciated that the various engines described herein can, in some implementations, share hardware, software, or data with other engines. As but one example, in some implementations, communication engine 32 and advertisement receiving engine 34 can share a computer-readable medium and/or processing resource, whereas in some implementations, communication engine 32 and advertisement receiving engine 34 use separate mediums and processing resources. It is appreciated that any engines of switch 12 can share hardware, software, or data with any other engine of switch 12 in order to achieve their respective objectives.

FIG. 3 is a diagram of another example of switch 12 in the form of functional modules. Switch 12 as depicted in FIG. 3 includes communication engine 32, advertisement receiving engine 34, and parsing engine 24, examples of which are described above with respect to FIG. 2. Switch 12 of FIG. 3 further includes additional engines, such as a security engine 46, a QoS engine 48, and a diagnostic engine 50, as described in further detail below.

Security engine 46 of switch 12 is to apply a pre-defined security configuration based on the parsed LUN metadata attributes. For example, when it is determined that the LUN is directed to information indicating heightened security, one or more security controls can be implemented to enforce security standards, such as suitable: (1) privacy controls, such as those relating to data encryption; (2) preventive controls, such as those relating to data authentication; (3)

monitoring controls, such as those relating to intrusion detection; (4) corrective controls, such as those relating to data backup; and (5) any suitable combination thereof. It is appreciated that other security controls can be implemented via security engine 46.

QoS engine 48 of switch 12 is to apply a pre-defined QoS configuration based on the parsed LUN metadata attributes. It is appreciated that network traffic is often subject to QoS guarantees, which can help ensure that network resources are used efficiently for multiple applications and services. For example, QoS guarantees can relate to acceptable bandwidths, latencies, error rates, jitter rates, and the like, As but one example, QoS engine 48 can apply a QoS configuration that includes re-routing data within SAN 10 if bandwidth for the data is below an acceptable level. It is appreciated that other QoS configurations can be applied by QoS engine 48 to achieve a desired QoS.

Diagnostic engine 50 of switch 12 is to apply pre-defined diagnostic settings based on the parsed LUN metadata attributes. Such diagnostic settings can, for example, be settings to analyze information about network connectivity to assist in troubleshooting network-related issues, As but one example, diagnostic engine 50 can apply diagnostic settings to allow heightened tracking of data within SAN 10. It is appreciated that other diagnostic settings can be applied by diagnostic engine 50.

In some implementations, LUN metadata attributes communicated using the techniques described herein can be leveraged by exposure to a RESTful Application Programming Interface (API) to further integrate into other network management frameworks. This can, in some implementations, provide for a central fabric service intelligence, which can, for example, enable easy integration and scalability. For example, LUN metadata attributes can be used with Software Defined Network (SDN) and OpenStack frameworks.

Figure 4:
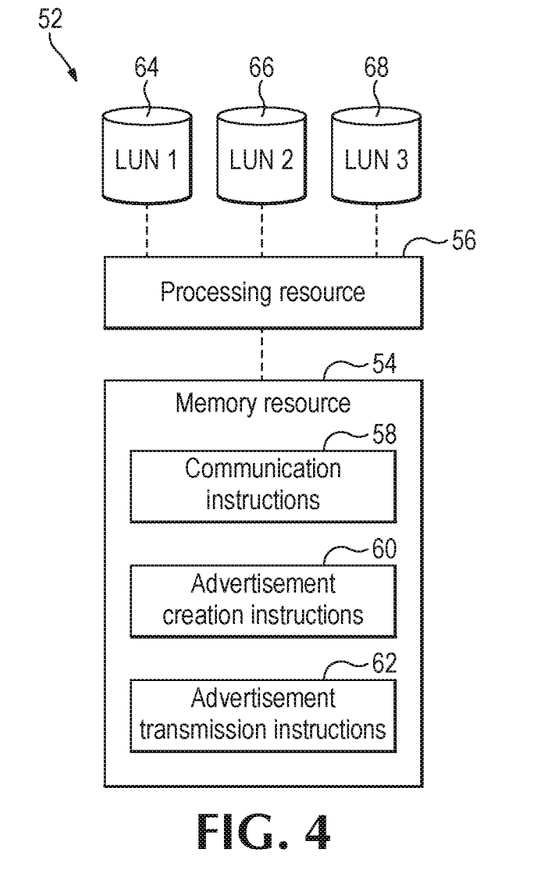
FIG. 4 is a block diagram depicting a target for use in the storage area network of FIG. 1, according to an example.

FIG. 4 illustrates a network device 52 according to an example. For illustration, network device 52 is referred to as a target of SAN (e.g., target 20) and with reference to SAN 10 and elements thereof (e.g., network switch 12, advertisement message 28, etc.). However, it is appreciated that network device 52 can be any suitable device of SAN 10 (or another SAN) and is not limited to the functionality of target 20 or to the environment of SAN 10. As described in further detail below, network device 52 includes a non-transitory computer-readable memory resource 54 that stores instructions, which when executed causes a processing resource 56 to allow creation and transmission of a multicast advertisement message 28 (see, e.g., FIG. 1). The instructions include: (1) communication instructions 58, (2) advertisement creation instructions 60, and (3) advertisement transmission instructions 62. These instructions are described in further detail below.

Communication instructions 58 of memory resource 54 are designed to allow network device 52 to connect to network switch 12 (or another suitable network device) in SAN 10 to allow network device 52 and network switch 12 to transfer data therebetween. Aspects of communication engine 32 of network switch 12 described above with respect to FIG. 2 can be incorporated in communication instructions 58 of network device 52. For example, in some implementations, communication instructions 58 can include instructions relating to the implementation of a network interface controller having an Ethernet port and/or a host bus adapter having a Fibre Channel port. Communication instructions 58 can, for example, include instructions such as firmware for implementing and/or administering physical or virtual network ports.

Advertisement creation instructions 60 of memory resource 54 are designed to create multicast advertisement message 28 for transmission through a management port of network device 52 (see, e.g., management port 42 of target 20 in FIG. 1). Advertisement creation instructions 60 are to include information identifying LUN metadata attributes for a LUN of network device 52. As illustrated for example in FIG. 4, network device 52 can include multiple LUNs, such as LUN 64, LUN 66, and LUN 68. The use of three LUNs is provided merely for illustration and it is appreciated that greater than three or less than three LUNs can be provided. Aspects of LUN metadata attributes are described in detail above with respect to switch 12 of FIG. 2.

In some implementations, advertisement creation instructions 60 are designed to create multicast advertisement message 28 in accordance with the Internet Group Management Protocol (IGMP). IGMP is a protocol operates between a client (e.g., network device 52) and a local multicast router. Switches, such as network switch 12, which feature IGMP snooping capabilities can derive useful information by observing IGMP transactions between the client and the router. In accordance with IGMP, advertisement message 28 can, for example, be in the form of an IP packet with a membership query message type (e.g., general and group-specific), membership report message type, or a leave group message type.

In some implementations, advertisement creation instructions 60 are to trigger the creation of multicast advertisement message 28 in response to a communication link being created between network device 52 and network switch 12. With respect to one example, a fibre channel host or target (e.g., network device 52) is connected to a switch (e.g., network switch 12) and the link comes up and becomes active. In this example, as soon as the link is up, network device 52 can, for example, identify a change indication to trigger network device 52 to send a standard IGMP join to a pre-defined multicast group through its own management port.

The following timeline provides an example service out-of-band announcement link up end to end state machine flow. To begin, SAN end points, such as target and initiator ports link up. An IGMP Join message is sent to a SAN multicast (MC) group through management port and the SAN announces the multicast packet (via a base and advance announcement), Next, a switch adds a table entry for SAN end point announcements and starts an aging timer on entry. Next, the switch sleeps for a random time between 1-30 seconds. Next, the SAN circulates end point announcements. In a first scenario, the SAN end point link is an unplanned transitioned from down (greater than aging timer) to up. In this scenario, IGMP leave on link down to the SAN MC group and IGMP is to join on link up to the SAN MC group and the SAN is to announce the MC packet (base+advance announcement). In this scenario, the switch ages out table entry for the endpoint and removes it from table. In a second scenario, the SAN end point link is a planned transitioned from down to up (e.g., port taken offline, or down, or array down or blade down). In this scenario, IGMP leave to the SAN MC group. In this scenario, the switch processes IGMP leave and immediately removes the SAN entry for end point that issued the IGMP leave. In either scenario, the switch, at a random time between 60 and 120 seconds, issues all end points update request. Next, the target responds to the update request with an out-of-band announcement (Base+advance announcement).

Advertisement transmission instructions 62 of memory resource 54 are designed to transmit multicast advertisement message 28 created by advertisement creation instructions 60 to network switch 12. In some implementations, advertisement message 28 is received by switch 12 via a push technology (e.g., wherein the request for a given transaction is initiated by a publisher) as opposed to pull technology (e.g., where the request is initiated by switch 12). In some implementations, all end devices of SAN 10 with parsable advertisement creation capabilities can be instructed to push LUN metadata attributes to a SAN fabric database through multicasting at either a management change, regular interval, or other suitable time. In some implementations, fabric end point metadata attributes are advertised using IGMP joins and multicast routing through ports of the network nodes. To receive an advertisement in certain such implementations, multicast networks that a desired audience exists on are linked to a common VLAN based network.

Suitable processing resources 56 can, for example, be in the form of a central processing unit (CPU), a semiconductor-based microprocessing resource, a digital signal processing resource (DSP) such as a digital image processing unit, other hardware devices or processing elements suitable to retrieve and execute instructions stored in a computer-readable medium, or suitable combinations thereof. Suitable processing resources can, for example, include single or multiple cores on a chip, multiple cores across multiple chips, multiple cores across multiple devices, or suitable combinations thereof. Suitable processing resources can be functional to fetch, decode, and execute instructions as described herein. As an alternative or in addition to retrieving and executing instructions, suitable processing resources can, for example, include at least one integrated circuit (IC), other control logic, other electronic circuits, or suitable combination thereof that include a number of electronic components for performing the functionality of instructions stored on a computer-readable medium. Suitable processing resources can, for example, be implemented across multiple processing units and instructions may be implemented by different processing units in different areas of computing system.

Suitable memory resources 54 can include any computer-readable medium for use by or in connection with an instruction execution system such as a computer/processor based system or an ASIC (Application Specific Integrated Circuit) or other system that can fetch or obtain the logic from computer-readable medium and execute the instructions contained therein. Suitable machine-readable storage mediums can, for example, be in the form of non-transitory storage mediums. The term "non-transitory" as used herein can, for example, refer to mediums that do not encompass a transitory signal but instead are made up of one or more memory resource components configured to store relevant machine-readable instructions. Such mediums can, for example, be in the form of electronic, magnetic, optical, or other physical storage mediums to store information, such as computer instructions.

Memory resources can, for example, be housed within the same housing as processing resources, such as for example within a common tower case, laptop housing, rack system, etc. In some implementations, a memory resource and a processing resource can be housed in different housings. As used herein, the term "machine-readable storage medium" can, for example, include Random Access Memory resource (RAM), flash memory resource, a storage drive (e.g., a hard disk; any type of storage disc (e.g., a Compact Disc Read Only Memory resource (CD-ROM), any other type of compact disc, a DVD, etc.), and the like, or a combination thereof. In some implementations, mediums can correspond to a memory resource including a main memory resource, such as a Random Access Memory resource (RAM), where software may reside during runtime, and a secondary memory resource. The secondary memory resource can, for example, include a nonvolatile memory resource where a copy of machine-readable instructions are stored. It is appreciated that instructions and data can be stored on separate machine-readable storage mediums. For purposes of clarity, multiple memory resources can be identified as a single memory resource and multiple processing resources can be identified as a single processing resource.

In one example, program instructions can be part of an installation package that when installed can be executed by processing resource 56 to implement the functionality of network device 12. In this case, memory resource 54 can be a portable medium such as a CD, DVD, or flash drive or a memory maintained by a server from which the installation package can be downloaded and installed. In another example, the program instructions may be part of an application or applications already installed.

It is appreciated that network device 12 can include additional elements, such as input/output (I/O) devices, a communication interface, etc. It is further appreciated that the various instructions of memory resource 54 (e.g., communication instructions 58, advertisement creation instructions 60, and advertisement transmission instructions 62) can be incorporated into a functional engines, such as advertisement creation engine 26, which can be operative to execute the instructions. As described above, the term "engine" refers to a combination of hardware (e.g., a processing resource such as an integrated circuit or other circuitry) and software (e.g., machine- or processing resource-executable instructions, commands, or code such as firmware, programming, or object code).

FIG. 6 is a flowchart for a method 70 of operating a switch in accordance with the disclosure herein. The description of method 70 and its component steps make reference to elements of switch 12 and other network elements of SAN 10 for illustration, however, it is appreciated that this method can be used or otherwise applicable for any suitable network element or SAN. Moreover, references to switch 12 of FIGS. 1-3 and elements thereof are not intended to suggest specific requirements or functionality of the switch of method 70. For example, method 70 can be applied to switches with different engines than that illustrated in switch 12 of FIG. 2.

Figure 5:
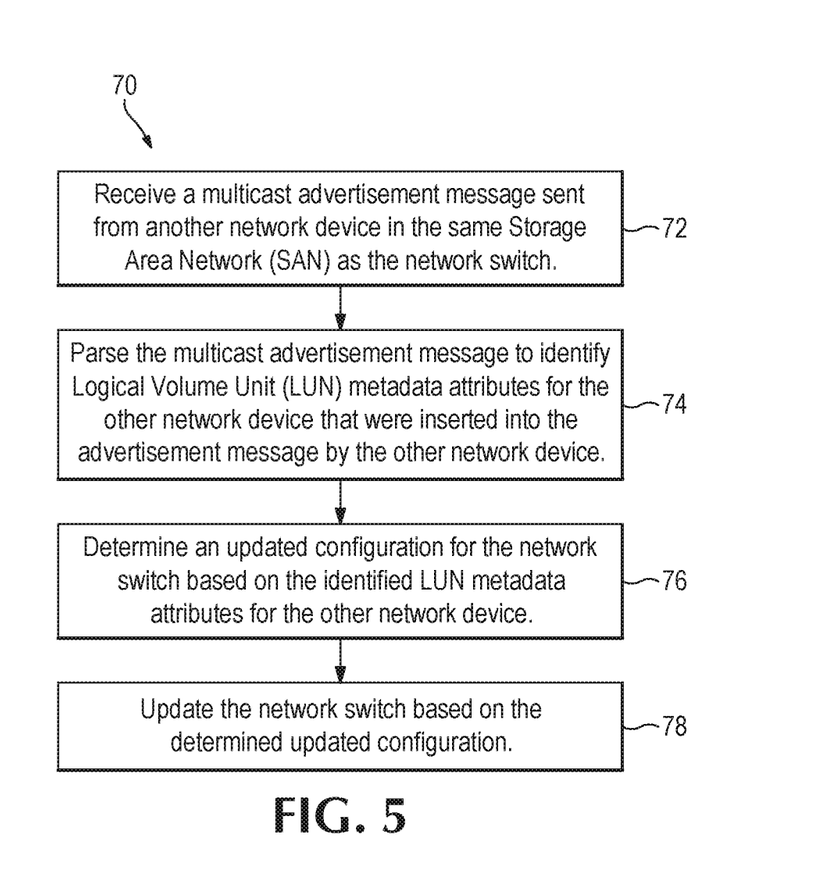
FIG. 5 is a flow diagram depicting steps taken to implement an example method.

Method 70 includes a step 72 of receiving multicast advertisement message 28 sent from another network device (e.g., target 20) in SAN 10. As described above with respect to advertisement receiving engine 34 of FIG. 2, step 72 can include switch 12 receiving multicast advertisement message 28 via a push technology (e.g., wherein the request for a given transaction is initiated by a publisher) as opposed to pull technology (e.g., where the request is initiated by switch 12). It is appreciated that any suitable aspects of advertisement receiving engine 34 of switch 12 described above with respect to FIGS. 2-3 can be applied to step 72 of method 70 and vice versa.

Method 70 includes a step 74 of parsing the multicast advertisement message to identify Logical Volume Unit (LUN) metadata attributes for the other network device (e.g., target 20) that were inserted into the advertisement message by the other network device. As described above with respect to parsing engine 24, LUN metadata attributes can be included in advertisement message 28 in pre-defined format and when switch 12 receives multicast announcement message 28 from an end device (e.g., target 20) or another switch (e.g., switch 14), it can parse the message and compile the parsed information into a pre-defined tabular data format. It is appreciated that any suitable aspects of parsing engine 24 of switch 12 described above with respect to FIGS. 2-3 can be applied to step 74 of method 70 and vice versa.

Method 70 includes a step 76 of determining an updated configuration for network switch 12 based on the identified LUN metadata attributes for the other network (e.g., target 20). As described above with respect to security engine 46 of FIG. 3, in some implementations, step 76 can include determining that a heightened security configuration should be applied in response to LUN metadata attributes that indicate heightened security for the LUN. As described above with respect to QoS engine 48 of FIG. 3, in some implementations, step 76 can include determining that a heightened QoS configuration should be applied in response to LUN metadata attributes that indicate that a heightened QoS for the LUN. As described above with respect to diagnostic engine 50 of FIG. 3, in some implementations, step 76 can include determining that different diagnostic settings should be applied in response to LUN metadata attributes that indicate that different diagnostic settings for the LUN. Is appreciated that any suitable aspects of security engine 46, QoS engine 48, and diagnostic engine 50 of switch 12 described above with respect to FIG. 1 can be applied to step 76 of method 70 and vice versa.

Method 70 includes a step 78 of updating network switch 12 based on the determined updated configuration. Switch 12 can be updated using any suitable update techniques. For example, in some implementations, configuration-specific images can be flashed to switch 12 to enable the updated configuration. In some implementations, flow tables or other routing rules for switch 12 can be updated based on the updated configuration. In some implementations, switch 12 can be rebooted after an updated configuration is installed.

In some implementations, method 70 includes a step of using multicast advertisement message 28 to associate an advertised service to a port of the network switch upon which the multicast advertisement message was received, For example, in some implementations, only messages that are services by a data port and sent on specific data ports to allow the network device to map services to physical ports it processes the updates on.

In some implementations, method 70 includes a step of sharing the identified LUN metadata attributes from multicast advertisement message 28 with neighboring network devices to network switch 12 using multicast to allow updating of a memory resident view of services available in the SAN for automated actions to be taken by network switch 12. For example, in some implementations, a process of parsing updates on a a given network device port of network switch 12 can allow network switch 12 to associate the contents of multicast advertisement message 28 to a physical port it was processed on. This ability can in some example allow a memory resident view of service to physical port to be created.

In some implementations, method 70 includes a step of building a map or table structure between a physical view and logical service view to allow application of settings or automation tasks on a given data port of the network switch. For example, a physical data port to service view mapping view can be used to build a map or table structure between a physical view and a logical service view. Once such a map or table structure (e.g., a memory resident table) is built, actions or decisions (e.g., applying a pre-defined security configuration) can be applied by network switch 12 using the logical or service to physical port information to apply settings or automation tasks on specific physical data ports.

In some implementations, method 70 includes a step of transmitting multicast advertisement message 28 to management software running outside SAN 10 to allow the management software to build a local physical view of data within the SAN. In some implementations, this can allow for flexible deployment options of the technology to accommodate various network contracts and physical topologies, It is appreciated that steps of method 70 can be rearranged, supplemented, or approximated using greater or fewer steps. As but one example, in some implementations, aspects relating to step 76 of determining an updated configuration for network switch 12 can occur during step 78 of updating network switch 12.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific engines or elements can be included at different engines or elements in other implementations.

As used herein, the term "provide" includes push mechanisms (e.g., sending data independent of a request for that data), pull mechanisms (e.g., delivering data in response to a request for that data), and store mechanisms (e.g., storing data at an intermediary at which the data can be accessed). Furthermore, as used herein, the term "based on" means "based at least in part on." Thus, a feature that is described based on some cause, can be based only on the cause, or based on that cause and on one or more other causes.

Furthermore, it should be understood that the systems, networks, devices, and methods described herein can include various combinations and/or sub-combinations of the components and/or features of the different implementations described. Thus, features described with reference to one or more implementations can be combined with other implementations described herein.

What is claimed is:
1. A network switch comprising:
a processing resource; and
a machine-readable memory resource on which is stored machine-readable instructions that when executed by the processing resource, cause the processing resource to:
connect the network switch to another network device in a Storage Area Network (SAN) to allow the network switch and the other network device to transfer data therebetween;
receive a multicast advertisement message pushed from the other network device, the advertisement message being parsable to identify Logical Volume Unit (LUN) metadata attributes for the other network device, the LUN metadata attributes including at least one category associated with a storage volume of the other network device;
parse the advertisement message to identify the LUN metadata attributes for the other networking device; and
update a configuration of the network switch based on the identified LUN metadata attributes;
wherein the at least one category associated with the storage volume of the other network device includes one or more of a LUN storage tier for the LUN, a use category for the LUN, an exchange server use cat- egory for the LUN, a database use category for the LUN, or a file system use category for the LUN.

2. The network switch of claim 1, wherein the network switch includes a management port and a data port to communicate with the other network device, and
wherein the machine-readable instructions are further to cause the processing resource to receive the multicast advertisement message from the other network device through the management port of the network switch.

3. The network switch of claim 1, wherein the multicast advertisement message is parsable to identify a LUN Storage Tier for the LUN.

4. The network switch of claim 1, wherein the multicast advertisement message is parsable to identify a use category for the LUN.

5. The network switch of claim 1, wherein the machine-readable instructions are further to cause the processing resource to apply a pre-defined security configuration based on the parsed LUN metadata attributes.

6. The network switch of claim 1,
wherein the machine-readable instructions are further to cause the processing resource to apply a pre-defined QoS configuration based on the parsed LUN metadata attributes.

7. A method comprising:
receiving, by a processing resource, through a port of a network switch, a multicast advertisement message pushed from another network device in the same Storage Area Network (SAN) as the network switch;
parsing, by the processing resource, the multicast advertisement message to identify Logical Volume Unit (LUN) metadata attributes for the other network device inserted into the advertisement message by the other network device, the LUN metadata attributes including at least one category associated with a storage volume of the other network device;
determining, by the processing resource, an updated configuration for the network switch based on the identified LUN metadata attributes for the other network device; and
updating, by the processing resource, the network switch based on the determined updated configuration;
wherein parsing the multicast advertisement message includes identifying the at least one category associated with the storage volume of the other network device, the at least one category including one or more of a LUN storage tier for the LUN, a use category for the LUN, an exchange server use category for the LUN, a database use category for the LUN, or a file system use category for the LUN.

8. The method of claim 7, wherein the multicast advertisement message is used to associate an advertised service to a port of the network switch upon which the multicast advertisement message was received.

9. The method of claim 7, wherein determining an updated configuration for the network switch includes determining that a heightened security configuration should be applied in response to LUN metadata attributes that indicate heightened security requirements for the LUN.

10. The method of claim 7, further comprising:
sharing the identified LUN metadata attributes with neighboring network devices to the network switch using multicast to allow updating of a memory resident view of services available in the SAN for automated actions to be taken by the network switch.

11. The method of claim 7, further comprising:
building a map or table structure between a physical view and logical service view to allow application of settings or automation tasks on a given data port of the network switch.

12. The method of claim 7, further comprising:
transmitting the multicast advertisement message to management software running outside the SAN to allow the management software to build a local physical view of data within the SAN.

13. A non-transitory computer-readable memory resource of a network device storing instructions that when executed causes a processing resource of the network device to:
allow the network device to connect to a network switch in a Storage Area Network (SAN) to allow the network device and the network switch to transfer data therebetween;
create a multicast advertisement message for transmission through a management port of the network device, wherein the multicast advertisement message includes information identifying Logical Volume Unit (LUN) metadata attributes for a LUN of the network device, the LUN metadata attributes including at least one category associated with the LUN of the network device; and
push the multicast advertisement message to the network switch;
wherein the at least one category associated with the LUN of the network device includes one or more of a LUN storage tier for the LUN, a use category for the LUN, an exchange server use category for the LUN, a database use category for the LUN, or a file system use category for the LUN.

14. The non-transitory computer-readable memory of claim 13, wherein the instructions are further to cause processing resource to create the multicast advertisement message in accordance with an Internet Group Management Protocol (IGMP).

15. The non-transitory computer-readable memory of claim 14, wherein the instructions are further to cause the processing resource to push the multicast advertisement message to a SAN fabric database through multicasting.

* * * * *